US011443117B2

(12) United States Patent
Yu et al.

(10) Patent No.: US 11,443,117 B2
(45) Date of Patent: Sep. 13, 2022

(54) CONTEXTUAL QUESTION ANSWERING USING HUMAN CHAT LOGS

(71) Applicant: INTERNATIONAL BUSINESS MACHINES CORPORATION, Armonk, NY (US)

(72) Inventors: Yang Yu, Acton, MA (US); Ming Tan, Malden, MA (US); Shasha Lin, Cambridge, MA (US); Saloni Potdar, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/688,843

(22) Filed: Nov. 19, 2019

(65) Prior Publication Data

US 2021/0150147 A1   May 20, 2021

(51) Int. Cl.
*G06F 40/30* (2020.01)
*G06F 40/109* (2020.01)
*G06F 40/284* (2020.01)

(52) U.S. Cl.
CPC ............ *G06F 40/30* (2020.01); *G06F 40/109* (2020.01); *G06F 40/284* (2020.01)

(58) Field of Classification Search
CPC ....... G06F 40/30; G06F 40/109; G06F 40/284
See application file for complete search history.

(56) References Cited

U.S. PATENT DOCUMENTS

| 9,348,817 B2 | 5/2016 | Bohra et al. |
| 2014/0358631 A1 | 12/2014 | Ghose et al. |
| 2018/0365321 A1* | 12/2018 | Ke ........................ G06N 3/0445 |

(Continued)

FOREIGN PATENT DOCUMENTS

| CN | 104679815 A | 6/2015 |
| CN | 109753661 A | 5/2019 |
| KR | 10-1851793 B1 | 4/2018 |

OTHER PUBLICATIONS

K. Hammond, R. Burke, C. Martin and S. Lytinen, "FAQ finder: a case-based approach to knowledge navigation," Proceedings the 11th Conference on Ailincial Intelligence for Applications, Los Angeles, CA, USA, 1995, pp. 80-86.

(Continued)

*Primary Examiner* — Kyle R Stork
(74) *Attorney, Agent, or Firm* — Conley Rose, P.C.

(57) ABSTRACT

A system includes a memory having instructions therein and at least one processor configured to execute the instructions to: receive a natural language question; determine, from a chat log comprising a plurality of chat session logs, a set of chat session logs most relevant to the natural language question; determine a respective plurality of non-overlapping text spans most relevant to the natural language question within each of a respective plurality of conceptual pseudo-documents; determine a conceptual pseudo-document most relevant to the natural language question; extract a question-answer pair most relevant to the natural language question from the most relevant pseudo-document; and convey the most relevant question-answer pair to a user. Each one of the conceptual pseudo-documents corresponds to a respective one of the most relevant chat session logs.

20 Claims, 5 Drawing Sheets

(56) References Cited

U.S. PATENT DOCUMENTS

2020/0117857 A1* 4/2020 Gnanasambandam .................... G16H 70/00
2020/0372025 A1* 11/2020 Yoon .................... G06N 3/0454

OTHER PUBLICATIONS

Burke, Robin D., Kristian J. Hammond, Vladimir A. Kulyukin, Steven L. Lytinen, Noriko Tomuro and Scott Schoenberg. "Question Answering from Frequently Asked Question Files: Experiences with the FAQ Finder System." AI Magazine 18 (1997): 57-66.

Kusner, Matt, Yu Sun, Nicholas Kolkin, and Kilian Weinberger. "From word embeddings to document distances." in International Conference on Machine Learning, pp. 957-966. 2015.

Seo, Min Joon, Aniruddha Kembhavi, Ali Farhadi and Hannaneh Hajishirzi. "Bidirectional Attention Flow for Machine Comprehension." CoRR abs/1611.01603v6, [cs.CL], Published at ICLR, 2017, 13 pages.

Zhu, C., Zeng, M. and Huang, X., 2018 SDNet: Contextualized Attention-based Deep Network for Conversational Question Answering. arXiv preprint arXiv:1812.03593v5, [cs.CL], Jan. 21, 2019, 8 pages.

C Santos, M Tan, B Xiang, B Zhou, Attentive pooling networks, arXiv preprint 1602 03609v1, [cs.CL], Feb. 11, 2016, 10 pages.

Ming Tan, Bing Xiang, Bowen Zhou, LSTM-based Deep Learning Models for non-factoid answer selection, arXiv preprint 1511.04108v4, [cs.CL], Mar. 28, 2016, 11 pages.

Pranav Rajpurkar, Jian Zhang, Konstantin Lopyrev, and Percy Liang. Squad: 100,000+ questions for machine comprehension of text. arXiv preprint: 1606.05250v3, [cs.CL], Oct. 11, 2016, 10 pages.

Siva Reddy, Danqi Chen, Christopher D. Manning, CoQA: A Conversational Question Answering Challenge. arXiv preprint:1808.07042v2, [cs.CL], Mar. 29, 2019, 18 pages.

Eunsol Choi, He He, Mohit Iyyer, Mark Yatskar, Wen-tau Yih, Yejin Choi, Percy Liang, Luke Zettlemoyer, QuAC: Question Answering in Context. arXiv preprint: 1808.07036v3, [cS.CL], Aug. 28, 2018, 11 pages.

David Ferrucci, Eric Brown, Jennifer Chu-Carroll, James Fan, David Gondek, Aditya A Kalyanpur, Adam Lally, J William Murdock, Eric Nyberg, John Prager, et al. 2010. "Building Watson: An overview of the DeepQA project," AI magazine 31(3): pp. 59-79.

Danqi Chen, Adam Fisch, Jason Weston, and Antoine Bordes. "Reading Wikipedia to answer open-domain questions." arXiv preprint arXiv:1704 00051v2, [cs.CL], Apr. 28, 2017, 10 pages.

Berant, J., Chou, A., Frostig, R., and Liang, P. (2013). Semantic parsing on freebase from question-answer pairs. IProceedings of the 2013 Conference on Empirical Methods in Natural Language Processing, pp. 1533-1544, Seattle, Washington, USA, Oct. 18-21, 2013.

Lee, Dong-Hyun. "Pseudo-label: The simple and efficient semi-supervised learning method for deep neural networks." in Workshop on Challenges in Representation Learning, ICML, vol. 3, p. 2. 2013, 7 pages.

Zuo, et al., "Topic Modeling of Short Texts: A Pseudo-Document View," KDD '16, Aug. 13-17, 2016, San Francisco, CA, USA, DOI: http://dx.doi.org/10.1145/2939672.2939880, 10 pages.

* cited by examiner

CONTEXTUAL QUESTION ANSWERING USING HUMAN CHAT LOGS

BACKGROUND

The present disclosure relates generally to the field of automated question answering and, more particularly, to frequently asked question ("FAQ") answering.

Automated question-answer ("QA") systems have applied information retrieval ("IR") and natural language processing ("NLP") techniques to answer questions posed by humans in natural languages. A QA system may construct its answers by querying a knowledge base comprising one or more corpora. Each such corpus may comprise a database or other collection of structured or unstructured natural language documents or other information.

SUMMARY

A method for answering a natural language question posed by a user is disclosed. The method includes receiving the natural language question. The method also includes determining, from a chat log comprising a plurality of chat session logs, a set of chat session logs most relevant to the natural language question. The method also includes determining a respective plurality of non-overlapping text spans most relevant to the natural language question within each of a respective plurality of conceptual pseudo-documents. The method also includes determining a conceptual pseudo-document most relevant to the natural language question. The method also includes extracting a question-answer pair most relevant to the natural language question from the most relevant pseudo-document. The method also includes conveying the most relevant question-answer pair to the user. Each one of the conceptual pseudo-documents corresponds to a respective one of the most relevant chat session logs.

A system for answering a natural language question posed by a user is also disclosed. The system includes a memory having instructions therein and at least one processor in communication with the memory. The at least one processor is configured to execute the instructions to receive the natural language question. The at least one processor is also configured to execute the instructions to determine, from a chat log comprising a plurality of chat session logs, a set of chat session logs most relevant to the natural language question. The at least one processor is also configured to execute the instructions to determine a respective plurality of non-overlapping text spans most relevant to the natural language question within each of a respective plurality of conceptual pseudo-documents. The at least one processor is also configured to execute the instructions to determine a conceptual pseudo-document most relevant to the natural language question. The at least one processor is also configured to execute the instructions to extract a question-answer pair most relevant to the natural language question from the most relevant pseudo-document. The at least one processor is also configured to execute the instructions to convey the most relevant question-answer pair to the user. Each one of the conceptual pseudo-documents corresponds to a respective one of the most relevant chat session logs.

A computer program product for answering a natural language question posed by a user is also disclosed. The computer program product includes a computer readable storage medium having program instructions embodied therewith. The program instructions are executable by at least one processor to cause the at least one processor to receive the natural language question. The program instructions are also executable by the at least one processor to cause the at least one processor to determine, from a chat log comprising a plurality of chat session logs, a set of chat session logs most relevant to the natural language question. The program instructions are also executable by the at least one processor to cause the at least one processor to determine a respective plurality of non-overlapping text spans most relevant to the natural language question within each of a respective plurality of conceptual pseudo-documents. The program instructions are also executable by the at least one processor to cause the at least one processor to determine a conceptual pseudo-document most relevant to the natural language question. The program instructions are also executable by the at least one processor to cause the at least one processor to extract a question-answer pair most relevant to the natural language question from the most relevant pseudo-document. The program instructions are also executable by the at least one processor to cause the at least one processor to convey the most relevant question-answer pair to the user. Each one of the conceptual pseudo-documents corresponds to a respective one of the most relevant chat session logs.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
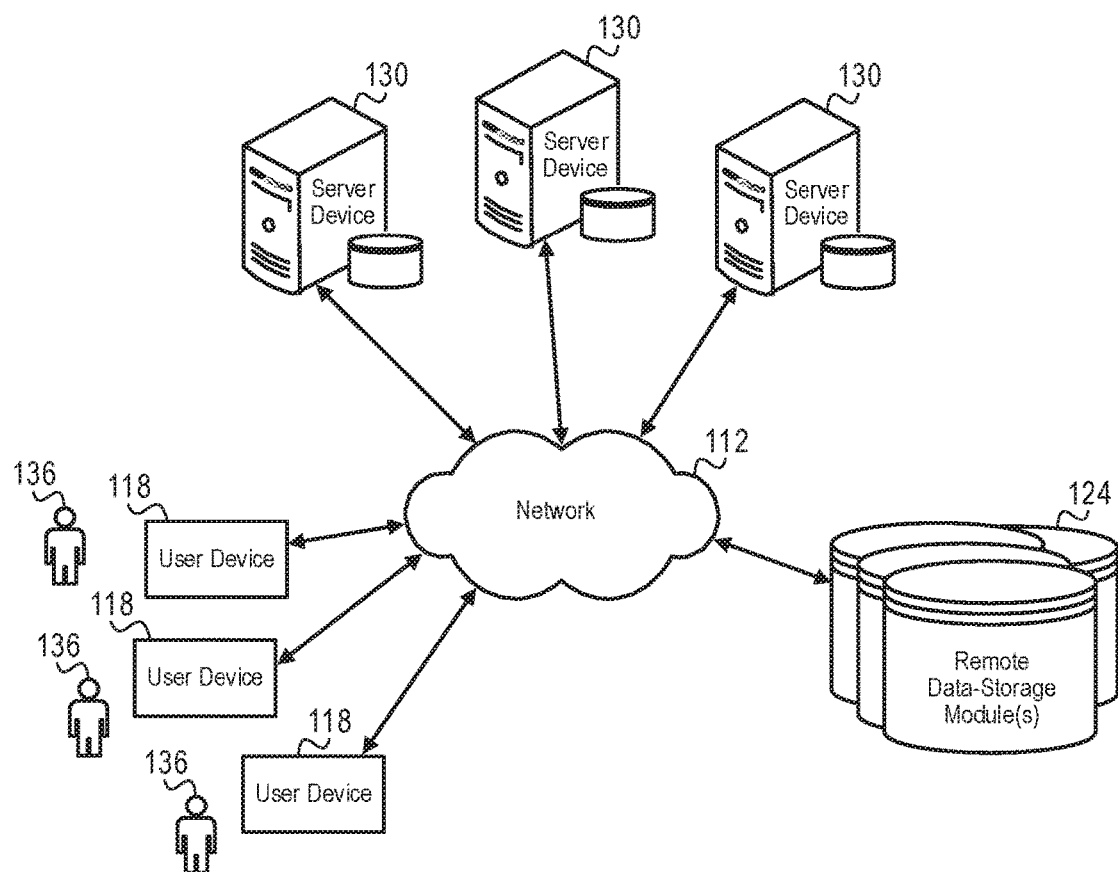
FIG. 1 is a block diagram illustration of a network environment in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Many businesses have needs to efficiently answer customer questions. Aspects of the present disclosure provide frequently asked question ("FAQ") answering by applying machine reading comprehension ("MRC") models directly on chat log records of actual conversations between human customers and human agents. Conceptually, such chat logs may comprise individual customer-agent communication session logs, where each such session log may comprise multiple turns of semantically related customer questions and agent answers, somewhat similarly to how paragraphs in a document may be semantically related. For example, in one customer-agent chat, the customer might ask the agent a follow-up question like "How long does the process take?" after a previous question like "Can I apply for a credit card with you over the phone?" In this example, the "process" in the follow-up question likely refers to the previously questioned process of applying for the credit card. In the future, if another customer were to ask a similar but slightly different question, like "How long will a credit card application take?" some aspects of the present disclosure may resolve the contextually best answer from the previous chat session logs.

As used within the written disclosure and in the claims, the terms "including" and "comprising" (and inflections thereof) are used in an open-ended fashion, and thus should be interpreted to mean "including, but not limited to" Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

FIG. 1 is a block diagram illustration of a network environment 100 in accordance with aspects of the present disclosure. The network environment 100 includes a network 112, one or more customer devices (or "user devices") 118, one or more remote data-storage modules 124, one or more server devices 130, and one or more users 136. The network 112 comprises any type of network that enables the one or more server devices 130 to communicate with each other and with the one or more user devices 118 as well as with the one or more remote data-storage modules 124. For example, the network 112 may comprise one or more wired and/or wireless networks such as, but not limited to, one or more radio networks (e.g., cellular network or mobile network), one or more local area networks ("LANs"), one or more wide area networks ("WANs"), one or more metropolitan area networks ("MANs"), etc. The network 112 may also comprise one or more private networks and/or one or more public networks (such as, but not limited to, the Internet).

Each of the one or more user devices 118 is communicatively coupled to the network 112 and (through the network 112) to the one or more server devices 130 and the one or more remote data-storage modules 124. Each of the one or more user devices 118 comprises any type of device that allows the one or more human customers (or "users") 136 to audibly, textually, or otherwise suitably interact with the one or more server devices 130 through the network 112. Non-limiting examples of one of the one or more user devices 118 include a personal computer (desktop or laptop), a mobile device (e.g., personal digital assistant ("PDA"), smart phone, tablet, etc.), and a cognitive voice assistant device (e.g., Amazon's Alexa®, a Google Home® device, etc.). In some embodiments, the one or more user devices 118 may comprise a corresponding one or more of a data processing system like the data processing system 500 (the data processing system 500 per se is not explicitly illustrated in FIG. 1, but see FIG. 5).

Each of the one or more remote data-storage modules 124 is communicatively coupled to the network 112 and (through the network 112) to each other and to the one or more server devices 130 and the one or more user devices 118. The one or more remote data-storage modules 124 are configured to (alone or in combination) store and provide access to chat logs and various other data that may be generated, modified, and/or used in accordance with aspects of the present disclosure. In some embodiments, the one or more remote data-storage modules 124 may comprise a corresponding one or more of a data processing system like the data processing system 500 (the data processing system 500 per se is not explicitly illustrated in FIG. 1, but see FIG. 5).

Each of the one or more server devices 130 is communicatively coupled to the network 112 and (through the network 112) to each other and to the one or more remote data-storage modules 124 and the one or more user devices 118. Each of the one or more server devices 130 comprises any type of device that can (alone or in combination with one or more other components of the network environment 100) implement a FAQ answering process 200 in accordance with aspects of the present disclosure (the process 200 per se is not explicitly illustrated in FIG. 1, but see FIG. 2). In some embodiments, the one or more server devices 130 may comprise a corresponding one or more of a data processing system like the data processing system 500 (the data processing system 500 per se is not explicitly illustrated in FIG. 1, but see FIG. 5). In some embodiments, the one or more server devices 130 may comprise one or more suitable computers, machines, modules, and/or devices provided by an Internet service provider.

Figure 2:
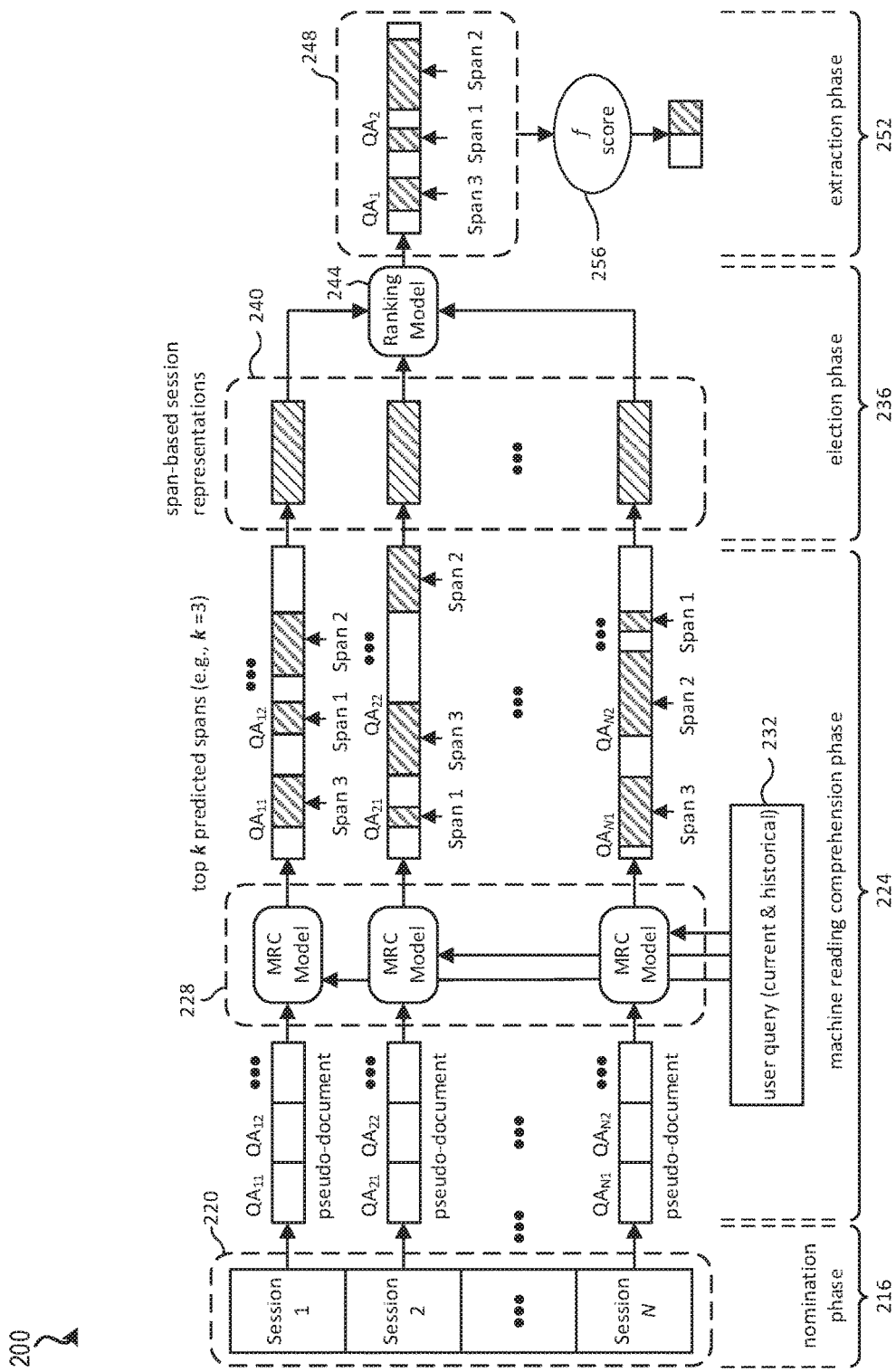
FIG. 2 is a process flow diagram illustration of a FAQ answering process in accordance with aspects of the present disclosure.

FIG. 2 is a process flow diagram illustration of the FAQ answering process 200 in accordance with aspects of the present disclosure. As described further below, the process 200 is configured to provide answers to frequently asked questions based on chat logs of conversations between human customers and human agents. In some instances, one or more steps of the process 200 may be performed by one or more of the server devices 130 (the server devices 130 per se are not explicitly illustrated in FIG. 2, but see FIG. 1) and/or one or more of the other systems, components, methods, and/or processes described herein. For clarity of exposition, the following description(s) of the process 200 may refer to one or more of such systems, components, methods, and/or processes. Nevertheless, it should be appreciated that the process 200 and/or any one or more of its particular steps may be performed by any suitable system(s), component(s), method(s), and/or process(es). It should also be appreciated that the process 200 may be performed concurrently or substantially concurrently with any other method(s) and/or process(es) described herein.

Referring to FIG. 2, during a nomination phase 216 the process 200 receives a natural language question from a user and uses a support vector machine with term frequency—inverse document frequency ("TF-IDF") features (not explicitly shown), and/or any other suitable information retrieval ("IR") ranking model, to select or nominate the top N most relevant customer-agent conversation (i.e., "chat session") logs 220 from a chat log as the most viable candidates for answering the question, where N is a natural number.

Next, during a machine reading comprehension phase 224, the process 200 inputs the chat session logs 220 into respective suitable machine reading comprehension ("MRC") models 228. Each of the MRC models 228 treats the question-answer ("QA") pairs of the respective one of the chat session logs 220 that it receives as being concatenated into a respective pseudo-document, and comprises one or more neural networks and/or other suitable components that compute the probabilities of a word in the respective conceptual pseudo-document being the start and end of the most relevant text span. Further, in addition to being configured to determine the top one span with highest probability (where the probability for the span is computed as the product of the start probability of the first word and the end probability of the last word in the span), each of the MRC models 228 is configured to use a greedy approach to determine the respective top k non-overlapping spans of text (instead of only the top one span) within each respective pseudo-document that have the highest probability of being the most relevant span to the user query, where k is a natural number. It should be appreciated, then, that each of the MRC models 228 is configured such that in appropriate instances a question-answer session (or pseudo-document) comprising multiple relevant answers (or effectively having a high degree of contextual richness) may be chosen over a session that comprises just one high probability answer. Additionally, if the current user question has some pertinent context 232 of its own (e.g., the user has proffered utterances or questions before current query), each of the MRC models 228 may also consider such context 232 as well. In some instances, the MRC models 228 may be pre-trained on one or more suitable large-scale reading comprehension datasets. Non-limiting examples of such suitable pre-training datasets are the Stanford Question Answering Dataset ("SQuAD"), which has been made available at https://rajpurkar.github.io/SQuAD-explorer/ by The Natural Language Processing Group at Stanford University ("Stanford NLP Group"), the Conversational Question Answering ("CoQA") dataset, which has been made available at https://stanfordnlp.github.io/coqa/ by Stanford NLP Group, and the Question Answering in Context ("QuAC") dataset, which has been made available at http://quac.ai/ by Choi, et al. of Cornell University. In some instances, pre-trained embodiments of the MRC models 228 may be fine-tuned on previous customer-agent chat logs to attain a business domain specific performance boost. It should be appreciated that for QA pairs in such human chat logs, a developer may have access to the ground truth answers, but typically will not have annotated text spans. In some instances, pseudo-labeling or other suitable techniques may be used in lieu of manually annotating large numbers of answer spans. Thus, during the machine reading comprehension phase 224, the process 200 uses the MRC models 228 to determine the respective top k most relevant non-overlapping text spans within each of the N respective conceptual pseudo-documents.

Next, during an election phase 236, the process 200 generates fixed-length vector representations 240 of the respective N conceptual pseudo-documents by pooling the learned representations of tokens in the respective top k relevant text spans in each of the respective pseudo-documents. The process 200 then inputs the representations 240 into another suitable IR ranking model 244. The process 200 then uses the IR ranking model 244 to determine and output the most relevant pseudo-document 248.

Next, during an extraction phase 252, the process 200 uses scoring features 256 to determine a most relevant text span within the most relevant pseudo-document 248, determine a single most relevant QA pair that includes at least some of the most relevant text span, and output that most relevant QA pair. More particularly, the scoring features 256 use MRC span probability computations to determine the most relevant span of text in the most relevant pseudo-document 248. Here, it should be appreciated that such text may or may not extend through or across more than one QA pair. Then, further, the scoring features 256 determine the QA pair boundaries, apply additional MRC probability computations to determine the most likely starting and ending words of the most relevant span of text, and determine (using the QA pair boundaries and the starting and ending words of the most relevant span of text) the single highest scoring QA pair (i.e., the QA pair comprising the highest scoring span of text). The scoring features 256 then output the single highest scoring QA pair as the most relevant QA match to the user question. In some embodiments, the scoring features 256 may also highlight, embolden, underline, italicize, and/or otherwise suitably emphasize (in the answer portion of the outputted QA pair) whatever portion of the most relevant span of text is contained within the answer portion of the outputted QA pair, thereby flagging such text as the most relevant information in the matched answer. It should be appreciated that when the most relevant span of text extends through or across more than one QA pair, the process 200 effectively resolves the contextually best answer. Additionally, to take historical context into account (or to learn from the current user query, for use in answering future queries), some embodiments may concatenate all previous user queries within the same user session together with the current user query for future use.

Figure 3:
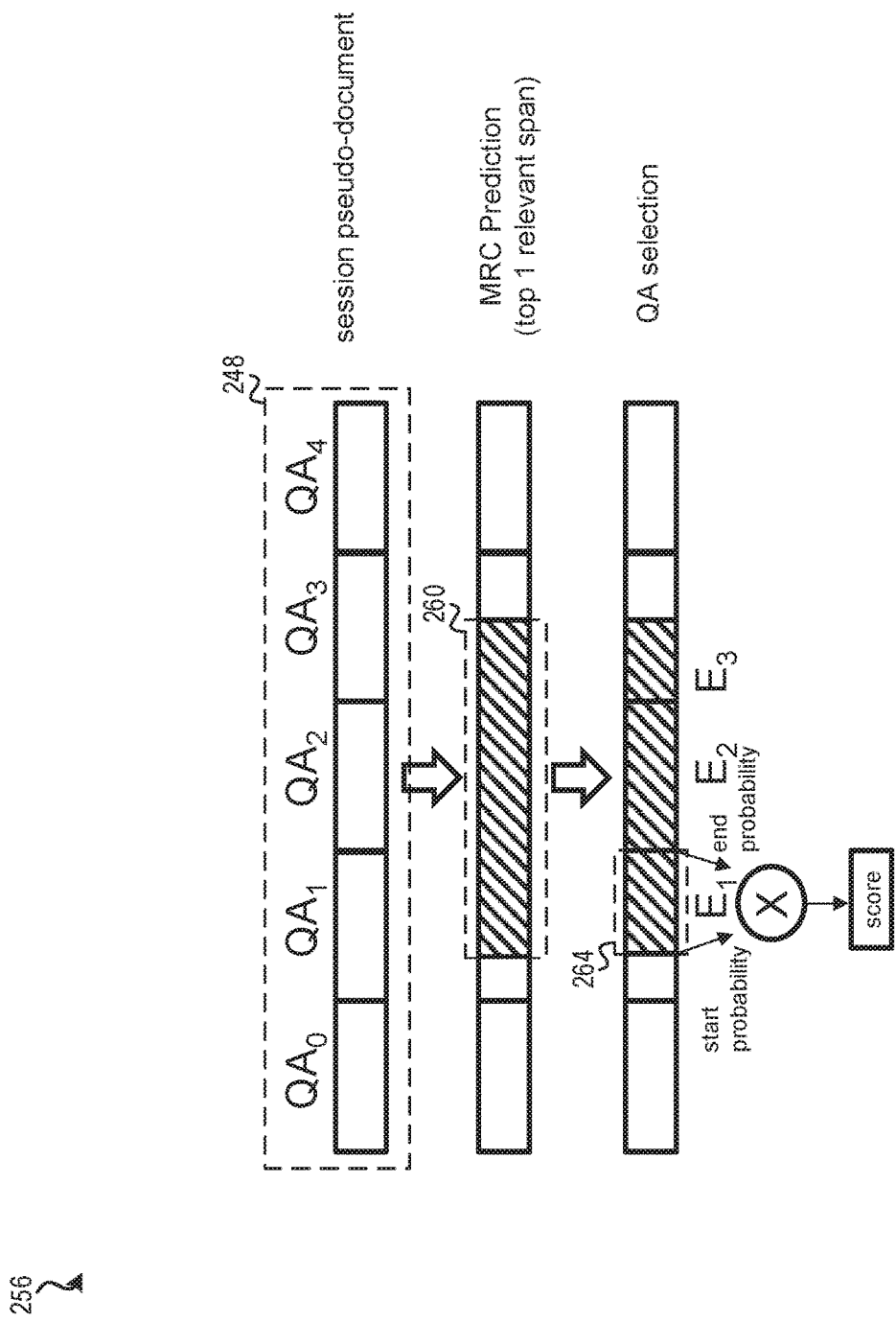
FIG. 3 illustrates example operations of some embodiments of the scoring features of the process of FIG. 2.

FIG. 3 illustrates example operations of some embodiments of the scoring features 256. Referring to FIG. 3, in some instances when the most relevant pseudo-document 248 comprises five QA pairs ($QA_0$, $QA_1$, $QA_2$, $QA_3$, and $QA_4$), MRC components of the scoring features 256 may determine the most relevant span of text 260 in the pseudo-document 248 to be a continuous piece of text spanning across $QA_1$, $QA_2$ and $QA_3$. The scoring features 256 may then cut the text 260 into three evidence pieces ($E_1$, $E_2$, and $E_3$), according to the QA pair boundaries. The scoring features 256 may then compute a matching score for each of the respective evidence pieces ($E_1$, $E_2$, and $E_3$) using two additional probabilities calculated by the MRC components (a first probability corresponding to the starting word of the most relevant answer, and a second probability corresponding to the starting word of the most relevant answer). The scoring features 256 may then output the QA pair comprising a portion of the highest scoring evidence piece 264 as the predicted match to the user query.

Figure 4:
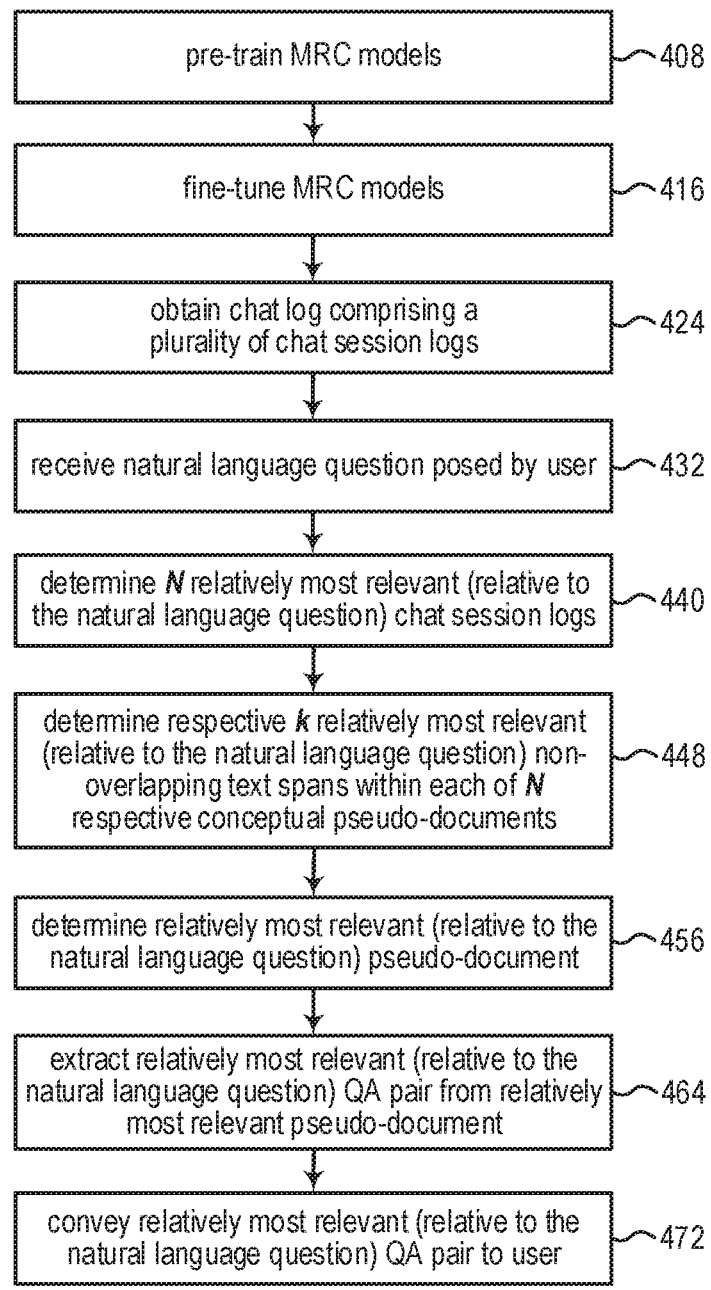
FIG. 4 is a flowchart illustration of the process of FIG. 2.

FIG. 4 is a flowchart illustration of the process 200. At step 408, the process 200 pre-trains the MRC models 228 on one or more suitable large-scale reading comprehension datasets. In some instances, the one or more reading comprehension datasets may have been stored in the one or more remote data-storage modules 124. In such instances, the one or more server devices 130 may access the reading comprehension dataset(s) from the one or more remote data-storage modules 124 (over the network 112), and may use the reading comprehension dataset(s) to pre-train the MRC models 228. From step 408, the process goes to (and continues at) step 416.

At step 416, the process 200 fine-tunes the MRC models 228 on previous chat logs (to attain a business domain specific performance boost). In some instances, the previous chat logs may have been stored in the one or more remote data-storage modules 124. In such instances, the one or more server devices 130 may access the chat logs from the one or more remote data-storage modules 124 (over the network 112), and may use the chat logs to fine-tune the MRC models 228. From step 416, the process goes to (and continues at) step 424.

At step 424, the process 200 obtains a chat log comprising a plurality of chat session logs. In some instances, the chat log may have been stored in the one or more remote data-storage modules 124. In such instances, the one or more server devices 130 may communicate one or more demands for the chat log to the one or more remote data-storage modules 124. In response to such demands, the one or more remote data-storage modules 124 may communicate the chat log to the one or more server devices 130. From step 424, the process goes to (and continues at) step 432.

At step 432, the process 200 receives a natural language question posed by a user. In some instances, one of the users 136 may cause a corresponding one of the user devices 118 to communicate the natural language question to the one or more server devices 130 (over the network 112). From step 432, the process goes to (and continues at) step 440.

At step 440, the process 200 determines the N chat session logs most relevant to the natural language question. In the network environment 100, the one or more server devices 130 determine the top N most relevant chat session logs 220 as described above in connection with the nomination phase 216. From step 440, the process goes to (and continues at) step 448.

At step 448, the process 200 determines the respective k non-overlapping text spans most relevant to the natural language question within each of N respective conceptual pseudo-documents, where each one of the conceptual pseudo-documents corresponds to a respective one of the most relevant chat session logs. In the network environment 100, the one or more server devices 130 determine the respective k most relevant non-overlapping text spans as described above in connection with the machine reading comprehension phase 224. From step 448, the process goes to (and continues at) step 456.

At step 456, the process 200 determines a pseudo-document most relevant to the natural language question. In the network environment 100, the one or more server devices 130 determine the most relevant pseudo-document as described above in connection with the election phase 236. From step 456, the process goes to (and continues at) step 464.

At step 464, the process 200 extracts the most relevant QA pair from the most relevant pseudo-document. In the network environment 100, the one or more server devices 130 extract the most relevant QA pair from the most relevant pseudo-document as described above in connection with the extraction phase 252. From step 464, the process goes to (and continues at) step 472.

At step 472, the process 200 conveys the most relevant (relative to the natural language question) QA pair to the user. In the network environment 100, the one or more server devices 130 output the single highest scoring QA pair as the most relevant QA match to the user question as described above in connection with the extraction phase 252 (and the scoring features 256). Further, the one or more server devices 130 communicate this QA pair (including, in some instances, text that may be emphasized as described above) to the one of the user devices 118 being used by the one of the users 136 who has posed the natural language question for answering. In turn, that one of the user devices 118 conveys the QA pair (including any emphasized text) to that corresponding one of the users 136.

Figure 5:
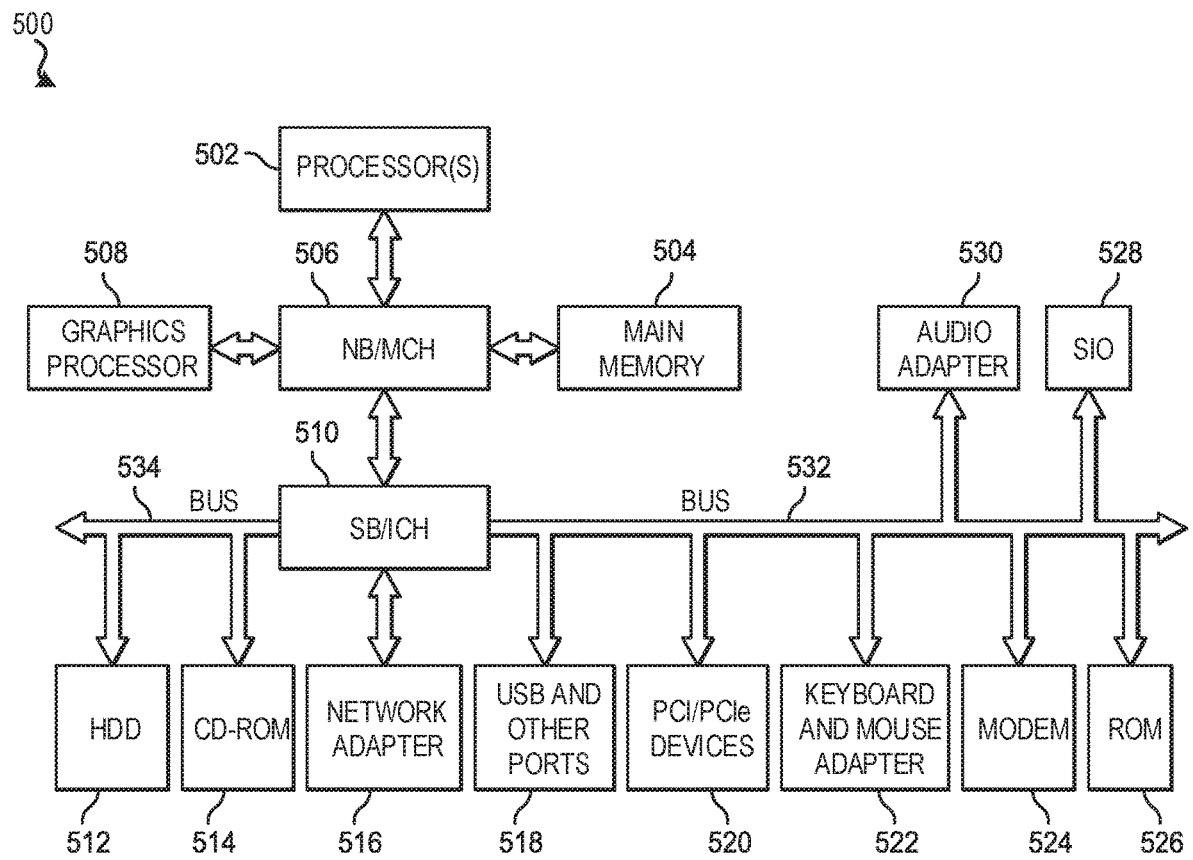
FIG. 5 is a block diagram illustration of a hardware architecture of a data processing system in accordance with aspects of the present disclosure.

FIG. 5 is a block diagram illustration of a hardware architecture of a data processing system 500 in accordance with aspects of the present disclosure. In some embodiments, one or more of the systems and/or components described herein (e.g., the network 112, the one or more user devices 118, the one or more remote data-storage modules 124, the one or more server devices 130, etc.) may be implemented using a corresponding one or more of the data processing system 500. Moreover, the data processing system 500 may be configured to store and execute one or more instructions of the process 200 and/or any other methods and/or processes described herein.

The data processing system 500 employs a hub architecture including north bridge and memory controller hub ("NB/MCH") 506 and south bridge and input/output ("I/O") controller hub ("SB/ICH") 510. Processor(s) 502, main memory 504, and graphics processor 508 are connected to NB/MCH 506. Graphics processor 508 may be connected to NB/MCH 506 through an accelerated graphics port ("AGP"). A computer bus, such as bus 532 or bus 534, may be implemented using any type of communication fabric or architecture that provides for a transfer of data between different components or devices attached to the fabric or architecture.

Network adapter 516 connects to SB/ICH 510. Audio adapter 530, keyboard and mouse adapter 522, modem 524, read-only memory ("ROM") 526, hard disk drive ("HDD") 512, compact disk read-only memory ("CD-ROM") drive 514, universal serial bus ("USB") ports and other communication ports 518, and peripheral component interconnect/peripheral component interconnect express ("PCI/PCIe") devices 520 connect to SB/ICH 510 through bus 532 and bus 534. PCI/PCIe devices may include, for example, Ethernet adapters, add-in cards, and personal computing ("PC") cards for notebook computers. PCI uses a card bus controller, while PCIe does not. ROM 526 may comprise, for example, a flash basic input/output system ("BIOS"). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics ("IDE") or serial advanced technology attachment ("SATA") interface. In some embodiments, the HDD 512 may be replaced by other forms of data storage devices including, but not limited to, solid-state drives ("SSDs"). A super I/O ("SIO") device 528 may be connected to SB/ICH 510. SIO device 528 may comprise a chip on the motherboard that is configured to assist in performing less demanding controller functions for the SB/ICH 510 such as controlling a printer port, controlling a fan, and/or controlling the small light emitting diodes ("LEDS") of the data processing system 500.

The data processing system 500 may include a single processor 502 or may include a plurality of processors 502. Additionally, processor(s) 502 may have multiple cores. In some embodiments, data processing system 500 may employ a large number of processors 502 that include hundreds or thousands of processor cores. In some embodiments, the processors 502 may be configured to perform a set of coordinated computations in parallel.

An operating system is executed on the data processing system 500 using the processor(s) 502. The operating system coordinates and provides control of various components within the data processing system 500. Various applications and services may run in conjunction with the operating system. Instructions for the operating system, applications, and other data are located on storage devices, such as one or more of the HDD 512, and may be loaded into main memory 504 for execution by processor(s) 502. In some embodiments, additional instructions or data may be stored on one or more external devices. The processes described herein for the illustrative embodiments may be performed by processor(s) 502 using computer usable program code, which may be located in a memory such as, for example, main memory 504, ROM 526, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for answering a natural language question, the method comprising:
   receiving the natural language question at a processing device;
   determining, using a support vector machine, a set of most relevant chat session logs to the natural language question from a chat log comprising a plurality of chat session logs;
   concatenating question and answer pairs in each of the set of most relevant chat session logs into a respective plurality of conceptual pseudo-documents;
   determining, using one or more machine reading comprehension (MRC) models, a probability for a start word and an end word for each of a plurality of non-overlapping text spans comprising one or more of the concatenated question and answer pairs for each of the respective plurality of conceptual pseudo-documents;
   determining, using the one or more MRC models, a most relevant non-overlapping text span to the natural language question from the plurality of non-overlapping text spans of the respective plurality of conceptual pseudo-documents;
   extracting a most relevant question-answer pair to the natural language question from the most relevant non-overlapping text span based upon the determined probability; and
   conveying the most relevant question-answer pair to a user device, wherein each one of the conceptual pseudo-documents corresponds to a respective one of the most relevant chat session logs in the set of most relevant chat session logs.

2. The method of claim 1, wherein determining the most relevant non-overlapping text span comprises generating respective fixed-length vector representations of the respective conceptual pseudo-documents.

3. The method of claim 2, wherein generating the respective fixed-length vector representations of the respective conceptual pseudo-documents comprises pooling learned representations of tokens in respective text spans in each of the respective conceptual pseudo-documents.

4. The method of claim 1, wherein extracting the most relevant question-answer pair from the most relevant non-overlapping text span comprises determining that the most relevant question-answer pair includes at least some of the most relevant non-overlapping text span.

5. The method of claim 4, wherein conveying the most relevant question-answer pair to the user comprises emphasizing, in an answer portion of the most relevant question-answer pair, at least a portion of the most relevant non-overlapping text span.

6. The method of claim 5, wherein emphasizing, in an answer portion of the most relevant question-answer pair, at least a portion of the most relevant non-overlapping text span comprises emphasizing at least a portion of the most relevant non-overlapping text span in at least one manner selected from the group consisting of highlighting at least a portion of the most relevant non-overlapping text span, emboldening at least a portion of the most relevant non-overlapping text span, underlining at least a portion of the most relevant non-overlapping text span, and italicizing at least a portion of the most relevant non-overlapping text span.

7. The method of claim 3, wherein extracting the most relevant question-answer pair from the most relevant non-overlapping text span comprises determining that the most relevant question-answer pair includes at least some of the most relevant non-overlapping text span, and wherein conveying the most relevant question-answer pair to the user comprises emphasizing, in an answer portion of the most relevant question-answer pair, at least a portion of the most relevant non-overlapping text span in at least one manner selected from the group consisting of highlighting at least a portion of the most relevant non-overlapping text span, emboldening at least a portion of the most relevant non-overlapping text span, underlining at least a portion of the most relevant non-overlapping text span, and italicizing at least a portion of the most relevant non-overlapping text span.

8. A system for answering a natural language question, the system comprising:
   a memory having instructions therein; and
   at least one processor in communication with the memory, wherein the at least one processor is configured to execute the instructions to:

receive the natural language question;
determine, using a support vector machine, a set of most relevant chat session logs to the natural language question from a chat log comprising a plurality of chat session logs;
concatenate question and answer pairs in each of the set of most relevant chat session logs into a respective plurality of conceptual pseudo-documents;
determine, using the one or more machine reading comprehension (MRC) models, a probability for a start word and an end word for each of a plurality of non-overlapping text spans comprising one or more of the concatenated question and answer pairs for each of the respective plurality of conceptual pseudo-documents;
determine a respective plurality of non-overlapping text spans most relevant to the natural language question within each of a respective plurality of conceptual pseudo-documents;
determine, using the one or more MRC models, a most relevant non-overlapping text span to the natural language question from the plurality of non-overlapping text spans of the respective plurality of conceptual pseudo-documents;
extract a most relevant question-answer pair to the natural language question from the most relevant pseudo-document based upon the determined probability; and
convey the most relevant question-answer pair to a user device, wherein each one of the conceptual pseudo-documents corresponds to a respective one of the most relevant chat session logs in the set of most relevant chat session logs.

9. The system of claim 8, wherein the at least one processor is further configured to execute the instructions to:
generate respective fixed-length vector representations of the respective conceptual pseudo-documents; and
determine the most relevant pseudo-document based on the respective fixed-length vector representations.

10. The system of claim 9, wherein the at least one processor is further configured to execute the instructions to:
pool learned representations of tokens in respective text spans in each of the respective conceptual pseudo-documents; and
generate the respective fixed-length vector representations based on the learned representations of tokens.

11. The system of claim 8, wherein the at least one processor is further configured to execute the instructions to:
determine a most relevant text span within the most relevant pseudo-document; and
extract the most relevant question-answer pair from the most relevant pseudo-document based on the most relevant text span.

12. The system of claim 11, wherein the at least one processor is further configured to execute the instructions to emphasize, in an answer portion of the most relevant question-answer pair, at least a portion of the most relevant text span.

13. The system of claim 12, wherein the at least one processor is further configured to execute the instructions to at least one of:
highlight, in the answer portion of the most relevant question-answer pair, at least a portion of the most relevant text span;
embolden, in the answer portion of the most relevant question-answer pair, at least a portion of the most relevant text span;
underline, in the answer portion of the most relevant question-answer pair, at least a portion of the most relevant text span; and
italicize, in the answer portion of the most relevant question-answer pair, at least a portion of the most relevant text span.

14. The system of claim 10, wherein the at least one processor is further configured to execute the instructions to:
determine a most relevant text span within the most relevant pseudo-document;
extract the most relevant question-answer pair from the most relevant pseudo-document based on the most relevant text span; and
wherein the at least one processor is further configured to execute the instructions to at least one of:
highlight, in an answer portion of the most relevant question-answer pair, at least a portion of the most relevant text span;
embolden, in an answer portion of the most relevant question-answer pair, at least a portion of the most relevant text span;
underline, in an answer portion of the most relevant question-answer pair, at least a portion of the most relevant text span; and
italicize, in an answer portion of the most relevant question-answer pair, at least a portion of the most relevant text span.

15. A computer program product for answering a natural language question, the computer program product comprising a computer readable storage medium having program instructions embodied therewith, the program instructions executable by at least one processor of a system to cause the system to:
receive the natural language question;
determine, using a support vector machine, a set of most relevant chat session logs to the natural language question from a chat log comprising a plurality of chat session logs;
concatenate question and answer pairs in each of the set of most relevant chat session logs into a respective plurality of conceptual pseudo-documents;
determine, using the one or more machine reading comprehension (MRC) models, a probability for a start word and an end word for each of a plurality of non-overlapping text spans comprising one or more of the concatenated question and answer pairs for each of the respective plurality of conceptual pseudo-documents;
determine a respective plurality of non-overlapping text spans most relevant to the natural language question within each of a respective plurality of conceptual pseudo-documents;
determine, using the one or more MRC models, a most relevant non-overlapping text span to the natural language question from the plurality of non-overlapping text spans of the respective plurality of conceptual pseudo-documents;
extract a most relevant question-answer pair to the natural language question from the most relevant pseudo-document based upon the determined probability; and
convey the most relevant question-answer pair to a user device, wherein each one of the conceptual pseudo-documents corresponds to a respective one of the most relevant chat session logs in the set of most relevant chat session logs.

16. The computer program product of claim 15, wherein the program instructions are further executable by the at least one processor to cause the at least one processor to:
generate respective fixed-length vector representations of the respective conceptual pseudo-documents; and
determine the most relevant pseudo-document based on the respective fixed-length vector representations.

17. The computer program product of claim 16, wherein the program instructions are further executable by the at least one processor to cause the at least one processor to:
pool learned representations of tokens in respective text spans in each of the respective conceptual pseudo-documents; and
generate the respective fixed-length vector representations based on the learned representations of tokens.

18. The computer program product of claim 15, wherein the program instructions are further executable by the at least one processor to cause the at least one processor to:
determine a most relevant text span within the most relevant pseudo-document; and
extract the most relevant question-answer pair from the most relevant pseudo-document based on the most relevant text span.

19. The computer program product of claim 18, wherein the program instructions are further executable by the at least one processor to cause the at least one processor to:
emphasize, in an answer portion of the most relevant question-answer pair, at least a portion of the most relevant text span.

20. The computer program product of claim 19, wherein the program instructions are further executable by the at least one processor to cause the at least one processor to:
highlight, in the answer portion of the most relevant question-answer pair, at least a portion of the most relevant text span;
embolden, in the answer portion of the most relevant question-answer pair, at least a portion of the most relevant text span;
underline, in the answer portion of the most relevant question-answer pair, at least a portion of the most relevant text span; and
italicize, in the answer portion of the most relevant question-answer pair, at least a portion of the most relevant text span.

\* \* \* \* \*